(12) United States Patent
Noda et al.

(10) Patent No.: US 6,425,206 B1
(45) Date of Patent: Jul. 30, 2002

(54) OPEN/CLOSE BODY CONTROL EQUIPMENT AND METHOD

(75) Inventors: Kohei Noda; Tomoaki Imaizumi; Eiji Itami; Ryoichi Fukumoto; Katsuhisa Yamada; Masao Ohhashi; Shintaro Suzuki, all of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/449,624

(22) Filed: Nov. 30, 1999

(30) Foreign Application Priority Data

Nov. 30, 1998 (JP) .............................. 10-340534

(51) Int. Cl.[7] .................................................. E05F 11/00
(52) U.S. Cl. ........................................... 49/360; 49/506
(58) Field of Search ...................... 49/360, 362, 279, 49/280, 506; 192/140, 143

(56) References Cited

U.S. PATENT DOCUMENTS 5,025,591 A  * 6/1991  DeLavo et al. ........... 49/280 X
5,069,000 A  * 12/1991 Zuckerman ............... 49/360 X
5,833,301 A  * 11/1998 Watanabe et al. ......... 49/360 X
6,009,671 A  * 1/2000  Sasaki et al. ............. 49/360 X
6,081,088 A  * 6/2000  Ishihara et al. ........... 49/280 X

FOREIGN PATENT DOCUMENTS

JP           11-190168      * 12/1997

OTHER PUBLICATIONS

Excerpt from Manual describing Gramvia, published by Toyota Jidosha Ltd., Aug. 1995, pp. 53–62.

* cited by examiner

Primary Examiner—Jerry Redman
(74) Attorney, Agent, or Firm—Burns, Doane, Swecker & Mathis, LLP

(57) ABSTRACT

A sliding door of a vehicle is braked in accordance with a position of the door. The braking is controlled such that the door speed is greater at the beginning of a door-opening or door-closing operation than at the end of the door-opening or door closing operation.

13 Claims, 13 Drawing Sheets

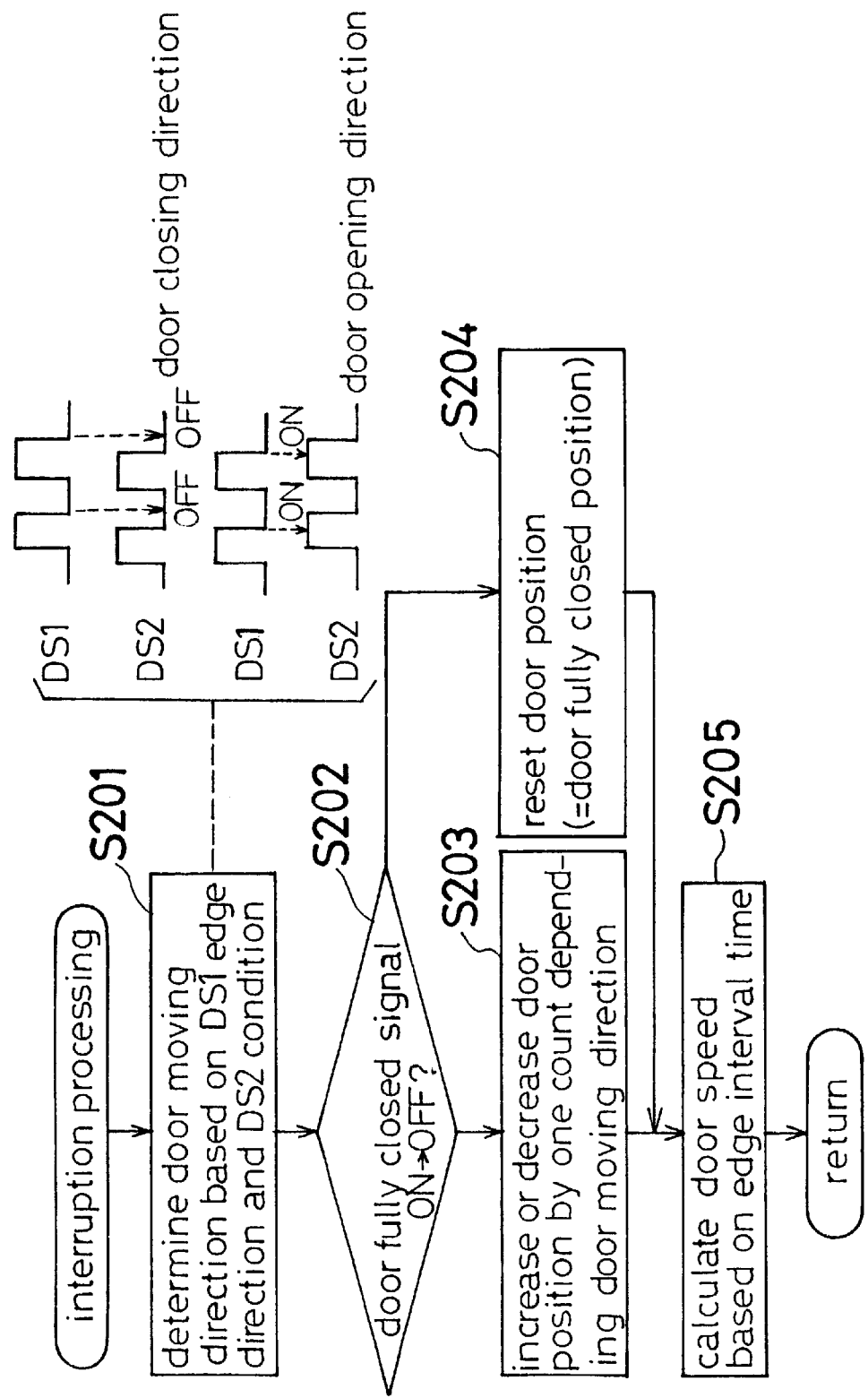

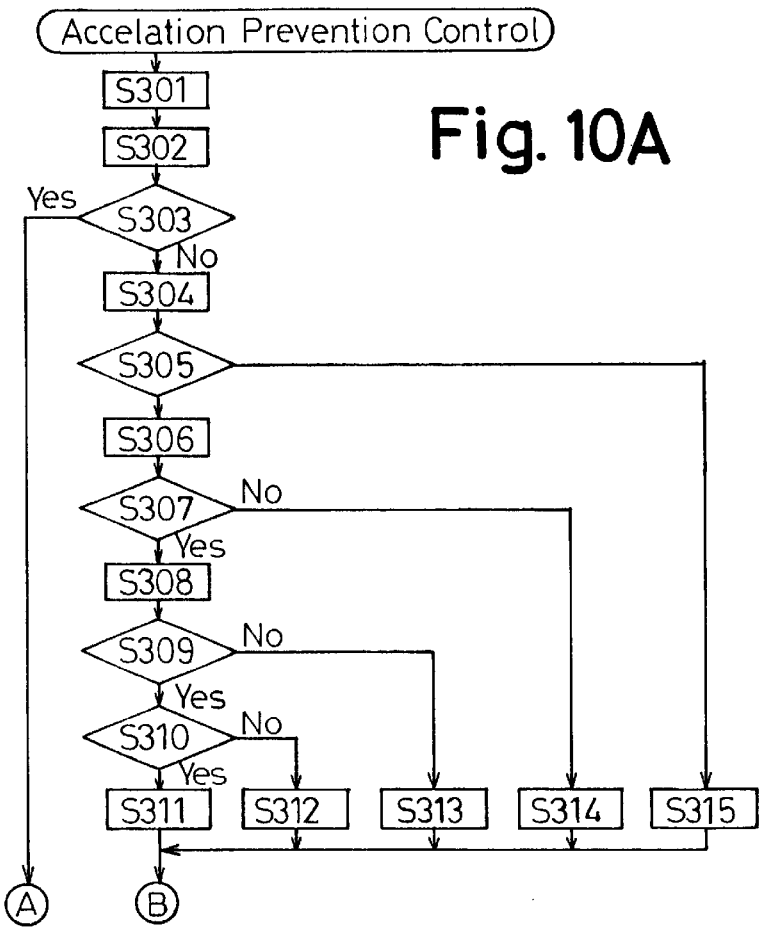

Fig. 10A

S301 : 4ms Last Time Door Speed = Door Speed
S302 : Door Information
S303 : Door Speed = 0 ?
S304 : Refer To Threshold Value
S305 : Door Speed ≧ Threshold Value ?
S306 : Deceleration Quantity = 4ms Last Time Door Speed - Door Speed
S307 : Deceleration Quantity > 0 ?
S308 : Speed Difference = Door Speed - Threshold Value
S309 : Deceleration Quantity < Speed Difference ?
S310 : Deceleration Quantity x 2 < Speed Difference ?
S311 : Duty On Time Slighty Increased
S312 : Duty On Time Held
S313 : Duty On Time Slighty Decreased
S314 : Duty On Largely Increased
S315 : Duty On Time Largely Decreased S316 : Restrict Increased or Decreased Duty On Time with Maximum Value S317 : Execute Voltage Compensation On Duty On Time With Reference Vo thus Setting This As On Count Number S318 : Restrict On Counter Number With Pulse One Period (80)

S319 : Door Speed < Output Off Threshold Value ?

S320 : Door Speed ≧ Output On Threshold Value ?

S321 : Duty Output On

S322 : Duty On Time = 0

S323 : Duty Output Off

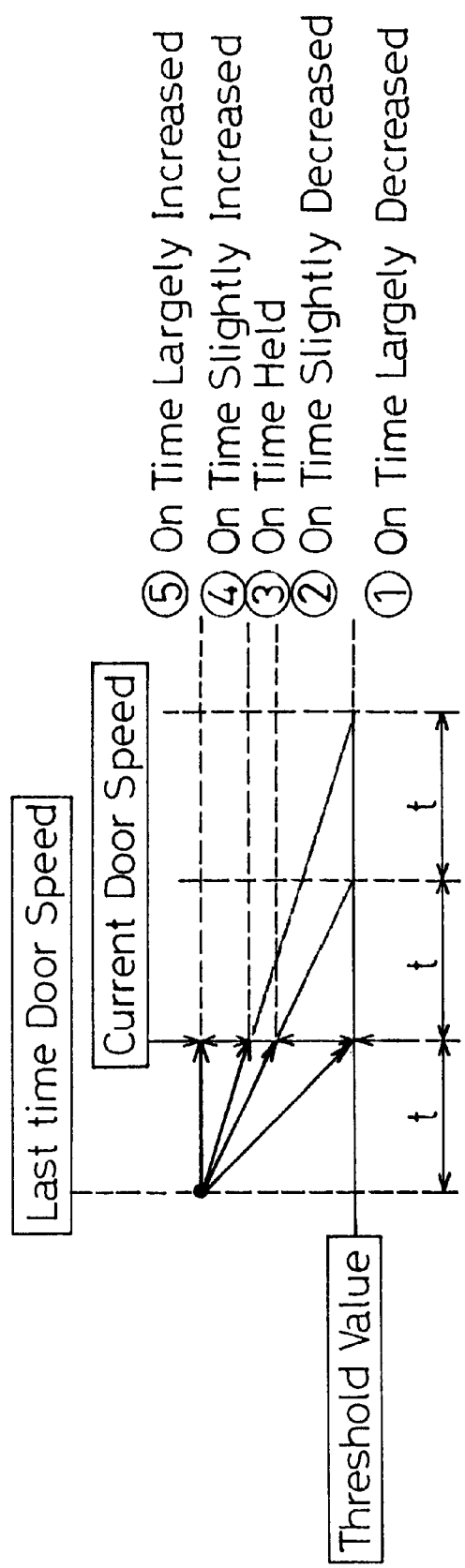

Fig. 13
(a)
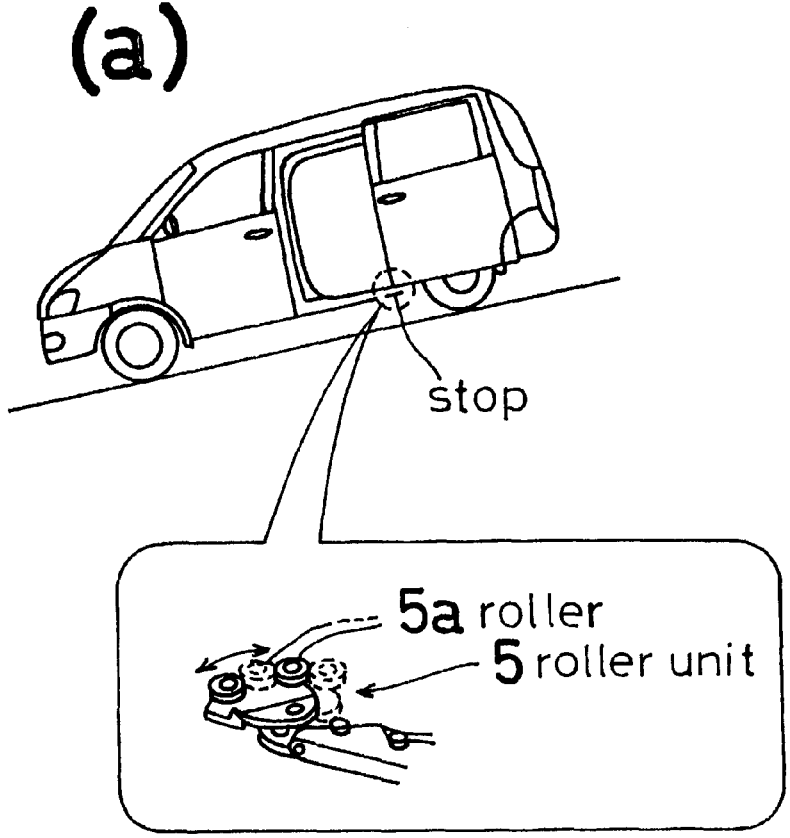
(b)
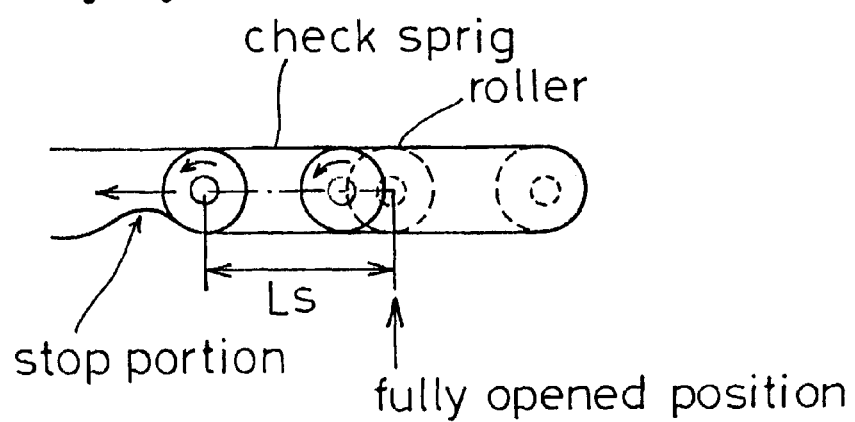

OPEN/CLOSE BODY CONTROL EQUIPMENT AND METHOD

FIELD OF THE INVENTION AND RELATED ART STATEMENT

This invention relates to an open/close body control equipment and method capable of operating an open/close body (e.g., slidable door or sunroof of a vehicle) so as to open or close the open/close body relative to a fixed member, and more particularly, to the speed control of the open/close body during the operation of the open/close body.

Recently, with respect to vehicles of the one-box type or the like, a slide door (i.e., an open/close body) is mounted on a rear portion of the vehicle and the vehicle adopts an electrically operating slide (a power slide equipment) which automatically opens or closes the slide door when a driver manipulates a manipulation switch mounted in the vicinity of a driver's seat. Such an electrically operated slide-door is disclosed, for example, on pages 53–62 of a manual 4 on a New Gramvia (published by Toyota Jidosha Ltd. on August, 1995).

This electrically operated slide door is constructed such that upon manipulation of a switch at the driver's seat, the slide door is electrically driven to become fully opened or fully closed. In the power transmission system between a motor which drives the slide door and the slide door itself, a clutch mechanism is interposed and in case a clutch incorporated in the clutch mechanism is turned off (disengaged), the slide door becomes manually operable, while in case the clutch is turned on (engaged), the slide door can be automatically driven by the motor.

In case such a slide door is forcefully opened or closed during manual manipulation in an opening or closing direction, the door speed reaches the high speed at the fully opened position or at the fully closed position so that it gives rise to a large manipulation sound when the slide door reaches the fully opened or closed condition and hence, the feeling of high quality is deteriorated.

Furthermore, in case the vehicle having the slide door is stopped on a descending slope for allowing a passenger to get on or off the vehicle, he has to grasp a handle of the slide door and carry out an opening/closing operation by the manual manipulation. In the midst of the closing operation from the fully opened position to the fully closed position, when the passenger becomes careless as his attention is focused on other things and removes his hand from the handle, the slide door starts its closing operation in a closing direction due to the deadweight thereof and hence, an accident that the passenger is pinched due to the gravitational slide movement of the slide door may occur.

In such a case, when the door speed is restricted by merely applying a continuous braking force to the movement of the slide door, the operability of the manual manipulation is worsened.

SUMMARY OF THE INVENTION

The present invention is made in view of the abovementioned problems and it is a primary technical task of the present invention to enhance the safety in operating an open/close body by the manual operation. It is a second technical task of the present invention to prevent the occurrence of a large sound at the time that the open/close body reaches the fully opened condition or the fully closed condition. Furthermore, it is a third technical task of the present invention to operate the open/close body with an improved operability.

To solve the above-mentioned problems, according to the present invention, in an open/close body control equipment which operates an open/close body relative to a fixed member so as to carry out an open/close operation by means of the open/close body, the equipment includes a brake mechanism which restricts the moving speed in the midst of the operation of the open/close body. An open/close body moving condition detecting means detects at least one of: the moving direction, the moving position and the moving speed while the open/close body is being moved, and the brake mechanism is operated in response to information from the detecting means.

Due to such a mechanism, at least one of: the moving direction of the open/close body, the moving position (position of the open/close body) and the speed of the open/close body is detected by the open/close body moving condition detecting means, and the brake mechanism is operated in response to information from the open/close body moving condition detecting means. Hence, a brake can be operated by means of the brake mechanism in response to the moving direction, the moving position, and/or the moving speed of the open/close body, and the operation of the open/close body can be restricted by the brake mechanism in response to the moving condition of the open/close body. For example, even in case the open/close body is forcefully manipulated manually, the speed of the open/close body is decreased due to the restriction of the brake mechanism and hence, the security is assured. Furthermore, the speed of the open/close body is suppressed when the open/close body reaches the fully open condition or the fully closed condition so that the manipulation sound at that moment can be suppressed more effectively than the conventional equipment, and the deterioration of the feeling which occurs with the conventional equipment no more occurs.

Here, in case the open/close body speed threshold value which corresponds to the moving position of the open/close body is set, and the brake mechanism is controlled based on the comparison between the information of the open/close body speed and the open/close body speed threshold value, by setting the proper speed threshold value corresponding to the moving position of the open/close body, the open/close body can be operated at the proper speed by operating the brake mechanism such that the open/close body assumes a given speed at that position during operation of the open/close body.

Furthermore, by making the speed threshold value of the open/close body assume a small value at the point of reaching the fully opened condition in case of moving the open/close body in an opening direction, or at he point of reaching the fully closed position in case of moving the open/close body in a closing direction, the speed can be sufficiently restricted at the fully opened position or the fully closed position so that safety is assured and the manipulation sound can be attenuated.

Still furthermore, in case of starting the operation of the open/close body, by making the speed threshold value of the open/close body assume a large value at the time of opening or closing the open/close body, it becomes possible to prevent the operability of the open/close body at the initial stage of the operation after starting from becoming worse.

In addition, in case the brake mechanism is operated under a duty control, a more precise control becomes possible due to such a duty control.

BRIEF DESCRIPTION OF THE DRAWING

The accompanying drawings which are incorporated in and constitute a part of this specification, illustrate a preferred embodiment of the invention and, together with the description, serve to explain the principles of this invention.

FIG. 9 is a flow chart showing the interruption processing carried out by a controller shown in FIG. 7.

FIGS. 10A and 10B illustrate a flow chart showing an acceleration prevention control shown in FIG. 8.

FIG. 11 is an explanatory graph showing the manner of setting a brake ON time of a duty control based on the relationship between the door speed of the slide door and the speed threshold value.

FIGS. 13(a) and 13(b) are explanatory views, wherein FIG. 13(a) shows the constitution of a roller unit which moves the slide door along a guide rail in case a vehicle is in an inclined condition and FIG. 13(b) shows the relationship between rollers of the roller unit and a check spring which stops the rollers in a given place.

DETAILED DESCRIPTION OF THE PREFERRED EMBODIMENT

One embodiment of the present invention is explained in conjunction with attached drawings hereinafter.

Figure 1:
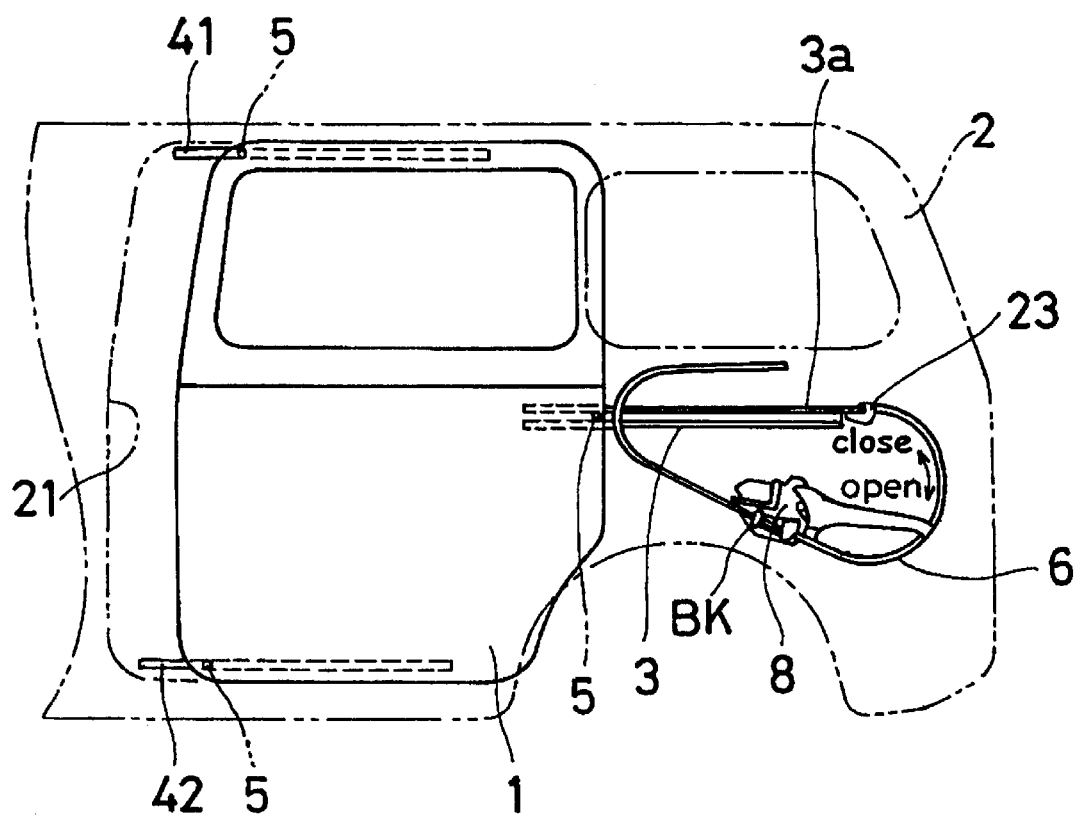
FIG. 1 is a mounting view showing open/close body control equipment (slide door control equipment) of one embodiment of this invention mounted on a vehicle.

As shown in FIG. 1, a slide door 1 is provided for opening or closing a rectangular door opening 21 formed in a side body 2 of a vehicle. The slide door 1 is slidably supported in a vehicle travelling direction (in a left-and-right direction in FIG. 1) by means of a center guide rail 3 and a pair of upper and lower guide rails 41, 42 extending in the vehicle travelling direction.

The upper guide rail 41 is disposed along and in the vicinity of the upper brim of the door opening 21 and is fixedly secured to the side body 2. Furthermore, the lower guide rail 42 is disposed along and in the vicinity of the lower brim of the door opening 21 and is fixedly secured to the side body 2. The center guide rail 3 is fixedly secured to the central outer surface of the side body 2 extending from the door opening 21 to the rear portion of the vehicle.

Three sets of guide roller units 5 which are respectively slidably guided by the guide rails 3, 41, 42 are mounted on the slide door 1. The slide door 1 opens or closes the opening 21 by the sliding movement thereof, wherein rollers 5a of the guide roller units 5 are slidably mounted in the inside of the guide rails 3, 41, 42 which are mounted on the vehicle side so that the rollers 5a are guided by the guide rails 3, 41, 42. In this case, the guide rails 3, 41, 42 are disposed in parallel with each other and extend in a traveling direction of the vehicle. The front ends of the guide rails 3, 41, 42 are bent toward the inside of the vehicle for guiding the slide door 1 so as to make the outer surface of the slide door 1 coplanar with the outside surface of the side body 2 at the time of closing the door opening 21. When the door opening 21 is closed by operating the slide door 1, the outer surface of the slide door 1 and the surface of the side body 2 of the rear portion of the vehicle are aligned (flush) with each other.

Figure 6:
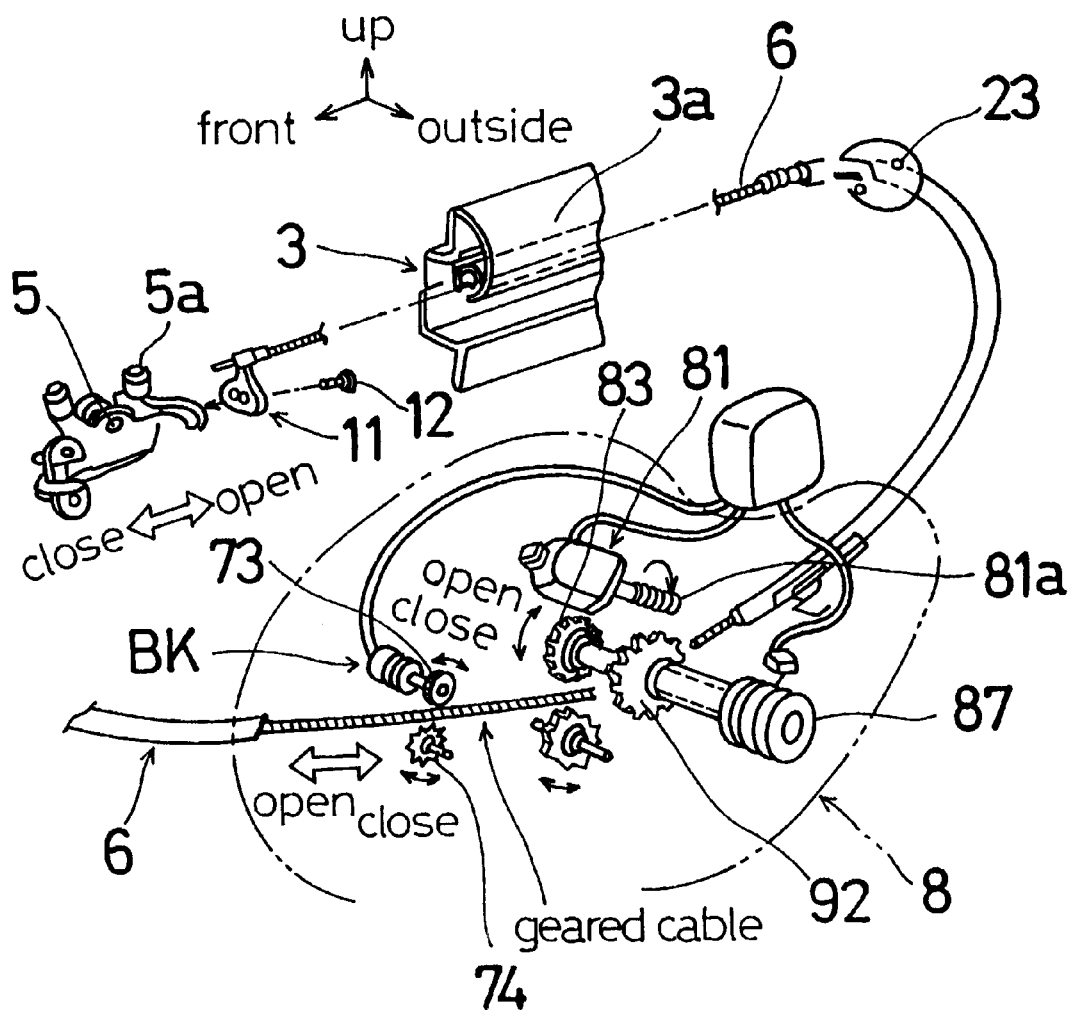
FIG. 6 is a perspective view showing a power transmission system from a motor of the drive mechanism shown in FIG. 2 to a slide door.

Subsequently, a mechanism to provide the slide movement of the slide door 1 will be explained in conjunction with FIG. 1 and FIG. 6.

The slide door 1 is connected to a geared (i.e., geardriven) cable 6 by way of a shoe 11 which is fixedly fastened to a roller unit 5 which is mounted on the rear portion of the slide door 1. This geared cable 6 is introduced into the inside of the vehicle by way of a grommet 23 which is mounted on the rear portion of the center guide rail 3 and is pushed or pulled by means of a drive mechanism (actuator) 8 fixedly secured to the indoor side of the side body 2 of the vehicle so as to slide the geared cable 6 in the inside of a guide pipe 3a formed in the center guide rail 3 (see FIG. 6). As a result, three sets of roller units 5 respectively roll on in the inside of the guide rails 3, 41, 42, and the slide door 1 is opened or closed along the guide rails 3, 41, 42.

Figure 2:
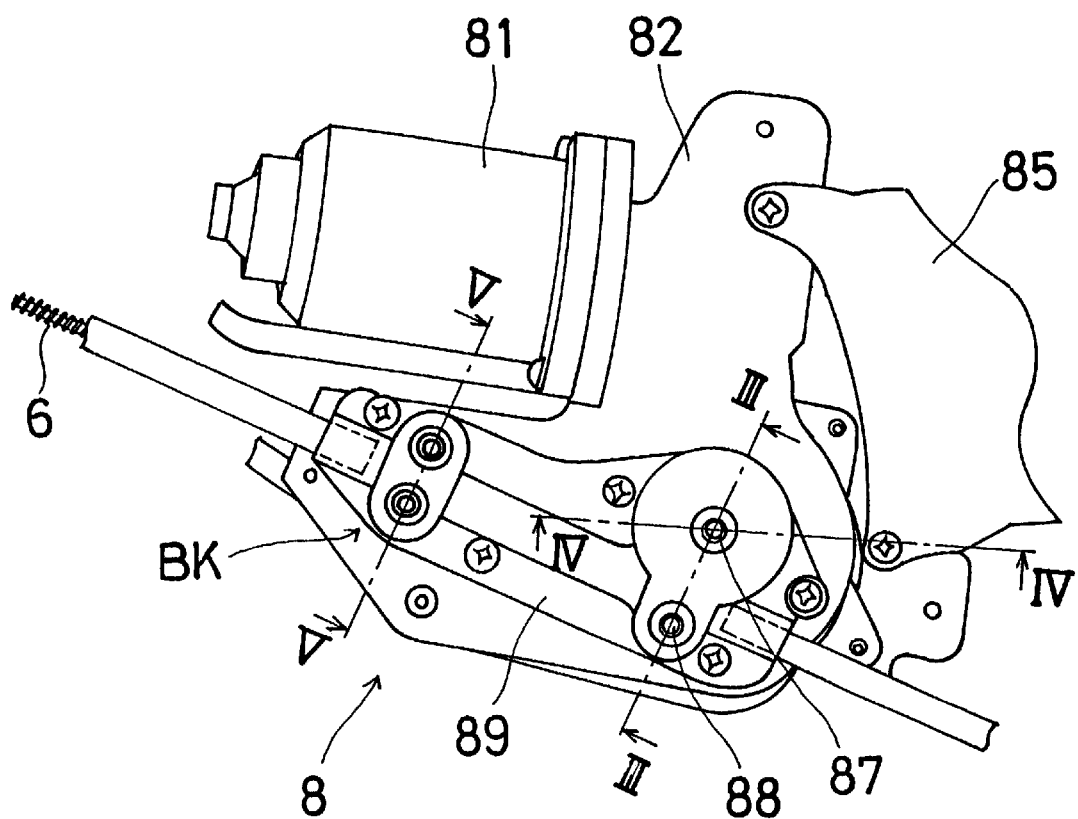
FIG. 2 is an enlarged partial view of an essential part of a drive mechanism shown in FIG. 1.
Figure 3:
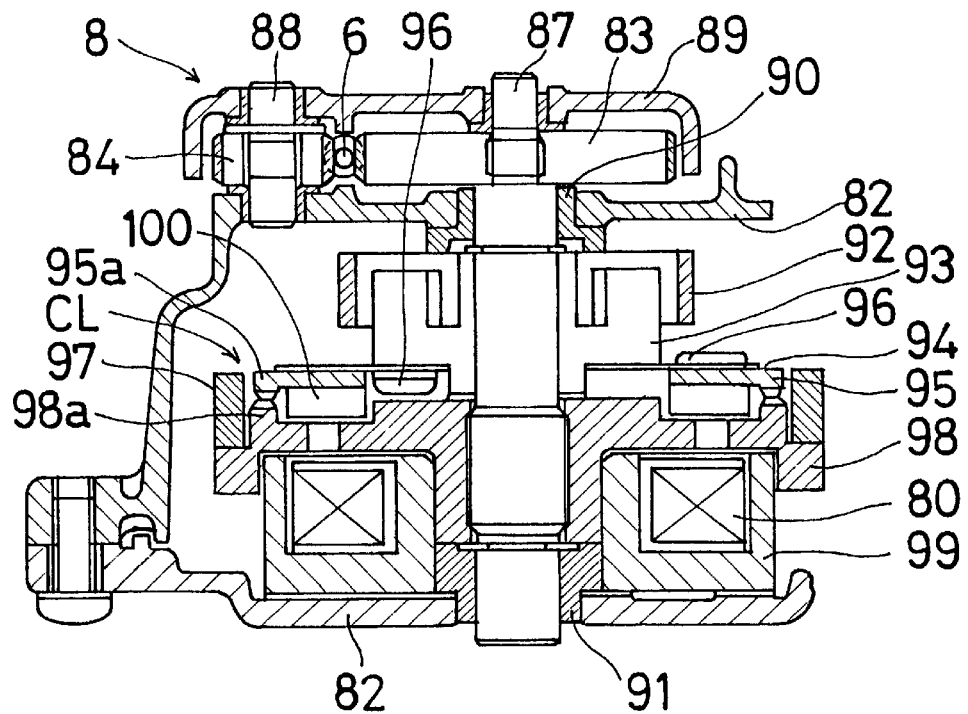
FIG. 3 is a cross sectional view of a drive mechanism of FIG. 2 taken along a line III—III.
Figure 4:
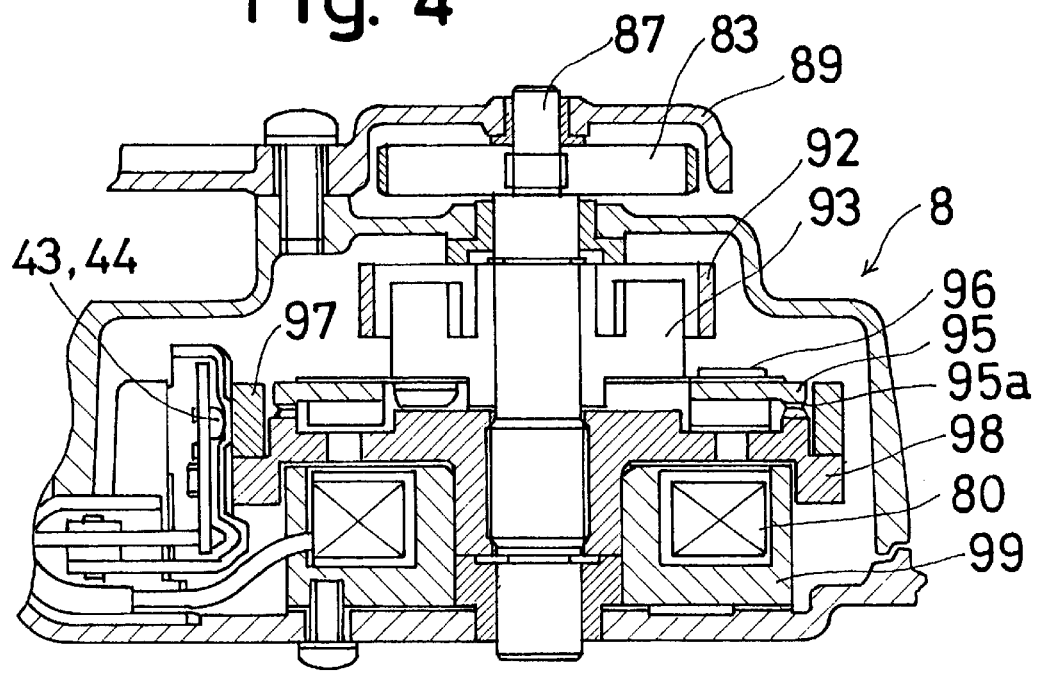
FIG. 4 is a cross sectional view of a drive mechanism of FIG. 2 taken along a line IV—IV.
Figure 5:
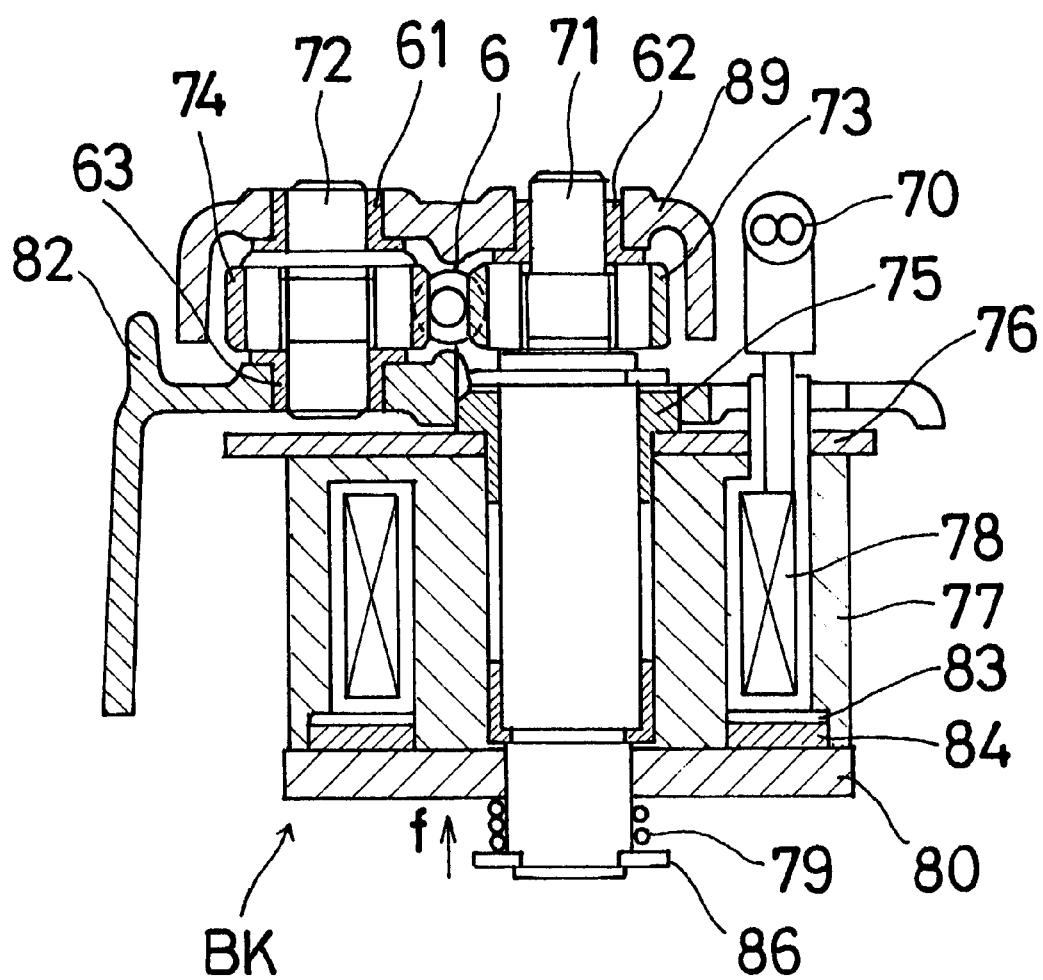
FIG. 5 is a cross sectional view of a drive mechanism of FIG. 2 taken along a line V—V.

FIG. 2 shows the construction of the drive mechanism 8 for opening or closing the slide door 1 and FIG. 3, FIG. 4 and FIG. 5 are respectively cross sectional views of FIG. 2 taken along lines III—III, IV—IV, V—V. The drive mechanism 8 is mounted on the inside of an indoor panel of the side body 2 of the vehicle by means of fixing means such as screws by way of a mounting bracket 85. A reduction mechanism is disposed in the inside of the housing 82 of the drive mechanism 8 and a direct current motor 81 for driving the reduction mechanism is mounted on and fixedly secured to the housing 82.

When the direct current motor 81 is electrically energized by way of an external wiring harness, electricity is supplied to a coil in the motor so that the motor 81 is rotatably driven. The rotation of the motor 81 is transmitted to a worm wheel (not shown in drawings) which is meshed with a worm 81a (see FIG. 6) mounted on an output shaft of the motor 81. The worm wheel is mounted in the inside of the housing 82 for reducing the speed of the rotation of the motor 81, and the rotational output of the worm wheel can be transmitted to an output shaft 87 pivotally mounted on a cover 89 mounted on the housing 82. Whether such transmission of the motor output to the shaft 87 occurs, depends upon the state of a clutch mechanism, as will be hereafter described.

A serration is formed on this output shaft 87, and an output gear 83 which is provided with a serration in an inner central portion thereof is keyed to the serration of the shaft 87. Upon rotation of the output shaft 87, the output gear 83 is integrally rotated with the output shaft 87. Upon rotation of this output gear 83, the geared cable 6 is pushed or pulled (being pulled when the output shaft 87 is rotated in a clockwise direction as shown in FIG. 6 in an opening operation, and being pushed when the output shaft 87 is rotated in a counterclockwise direction as shown in FIG. 6 in a closing operation) so as to carry out the opening and closing operation of the slide door 1. In this case, the geared cable 6 which pushes or pulls the slide door 1 is meshed with a driven gear 84 mounted on a driven shaft 88 which in turn is mounted on the housing 89 on which the output gear 83 is also pivotally mounted. Due to such an arrangement, the geared cable 6 is sandwiched between the output gear 83 and the driven gear 84 and the geared cable 6 is reliably meshed with both gears 83, 84.

A clutch mechanism CL is mounted on the output shaft 87 in an axial direction. The output shaft 87 is rotatably supported by bearings 90, 91 pushed into the housing 82 and a cover 89. The output shaft 87 is provided with a serration at two portions (upper and lower portions) thereof. A rotor 98 and the output gear 83 each have outer teeth and are mounted on respective ones of these serrated portions of the output shaft 87 so as to rotate together with the shaft.

The bearing 91 is pushed into a central portion of an annular core 99 which is accommodated in the case 82. The core 99 is provided with a central opening at a central portion thereof into which the bearing 91 is pushed and also provided with a circumferential recessed portion at an outer peripheral portion thereof. In this circumfential recessed portion, a circular coil 80 which receives electricity from the outside by way of a wire harness and is coaxial with the output shaft 87 is disposed in a circumferentially wound manner in the circumferential recessed portion. Furthermore, a rotor 98 is coaxial with the core 99 in such a manner that the rotor 98 closes the opening of the circumferential recessed portion of the core 99. A ring-like magnet 97 is fixedly secured to the rotor 98 such that its outer periphery has the same diameter as that of the rotor 98. The magnet 97 is fixedly secured to the rotor 98 such that eighty sets of N/S poles are respectively alternately magnetized on the outer periphery thereof. The rotor 98 and the magnet 97 are integrally rotated upon rotation of the output shaft 87. Two rotating position detection sensors 43, 44 (FIG. 4) are provided having hole elements which change signals in response to the N/S polarities of the magnet 97 and are disposed opposite to the magnet 97 and are arranged in a circumferential direction. These sensors output waveforms whose phases are shifted 90° from each other. These sensors function as sensors for detecting the rotating condition of the motor 81, that is, the degree of opening of the slide door 1 by the rotation of the motor in this embodiment. Accordingly, these sensors 43, 44 are called door sensors. The signals obtained by these sensors are outputted to the outside by way of the harness (see FIG. 4).

Furthermore, this rotor 98 is made of magnetic material and a circumferential protrusion 98a is formed on the rotor 98 at the inner diameter side of the magnet 97. The protrusion 98a formed on the rotor 98 and a protrusion 95a formed on a ring member 95 extend axially and are arranged on the same diameter position in an axial direction and usually they face each other in an axially opposed manner with a given axial gap therebetween.

On the other hand, an annular armature 100 (FIG. 3) made of magnetic material for strengthening the generated electromotive force is fixedly secured to the ring member 95 at the inner diameter side of the protrusion 95a of the ring member 95. By supplying electricity to the coil 80 disposed in the core, a magnetic closed loop is formed among the core 80, the rotor 98 and the armature 100. Accordingly, due to this electromagnetic force, the protrusion 98a of the rotor 98 and the protrusion 95a of the ring member 95 are attracted to each other in an axial direction, and the rotor 98 and the ring member 95 can be integrally rotated, whereby the core 99, the coil 80, the rotor 98, the armature 100 and the ring member 95 function as an electromagnetic clutch.

Furthermore, a flat spring 94 is fixed on a surface of the ring member 95 situated opposite to the surface on which the protrusion 95a of the ring member 95 is formed. A hub 93 is arranged freely rotatably on the shaft 87 and is fixedly connected to the spring 94 by means of rivets 96. Thus, the hub 93 is rotated together with the ring member 95.

A gear 92 (arranged to be driven by the worm wheel that is driven by the motor 81) is fitted into the hub 93 with a suitable vibration damper (not shown) disposed therebetween. Upon rotation of the motor 81, the impact caused by the rotation of the worm wheel is absorbed by the damper and is received by the gear 92.

Due to such an arrangement, to open or close the slide door 1 using electric power, the coil 80 is first energized. When the electricity is supplied to the coil 80, the magnetic closed loop is formed among the core 80, the rotor 98 and the armature 100, whereupon the protrusion 98a of the rotor 98 and the protrusion 95a of the ring member 95 are attracted to each other in an axial direction by the electromotive force. Thus, the electromagnetic clutch CL is switched to an ON condition so that the rotor 98 and the ring member 95 are integrally rotated. In this manner, by electrically setting the clutch to the ON condition the motor 81 is driven, and the protrusion 98a of the rotor 98 and the protrusion 95a of the ring member 95 are attracted to each other due to the electromagnetic force thus forming an integral body. Under such a condition, the rotation of the motor 81 is transmitted to the worm wheel (not shown) of the reduction mechanism by means of the worm 81a mounted on the motor output shaft. The rotation of the worm wheel is received by the outer teeth of the gear 92 while the impact is absorbed by the damper interposed between the hub 93 and the gear 92. With the clutch held in such an ON condition, the rotation is transmitted to the rotor 98 by way of the ring member 95 which is rotated integrally with the gear 92. The force transmitted to the rotor 98 rotates the output shaft 87. As a result, the output gear 83 which is integrally rotatable with the output shaft 87 is rotated. Upon rotation of this output gear 83, along with the driven gear 84 disposed at the opposite side of the geared cable 6, the geared cable 6, which is assuredly meshed with the output gear 83 and the driven gear 84, opens or closes the slide door 1.

On the other hand, in case the slide door 1 is to be opened or closed by a manual operation, electricity is not supplied to the coil 80 and the motor 81 and hence, the clutch CL is turned off (the condition that a given gap is held between the protrusion 98a of the rotor 98 and the protrusion 95a of the ring member 95 so that the mechanical connection of the power transmission system is not established). Although the output gear 83 and the rotor 98 are rotated by the manual manipulation of the slide door 1, the power transmission train connected to the motor 81 is cut off by the deactivated clutch so that the slide door 1 can be manually opened or closed.

Subsequently, a brake mechanism BK which is attached to this drive mechanism 8 will be explained hereinafter. As shown in FIG. 2, this brake mechanism BK is mounted adjacent a path in which the geared cable 6 travels. This brake mechanism BK is operable to restrict the movement of the geared cable 6 by applying a brake to the moving geared cable 6 in case the slide door 1 is not electrically operated.

As shown in FIG. 5, a brake gear 73 which is mounted on a brake shaft 71, and a driven gear 74 which is mounted on a driven shaft 72 of the brake mechanism BK are meshed with the geared cable 6 from opposite sides thereof. The gears 73, 74 are mounted on the brake shaft 71 and the driven shaft 72 respectively by means of a serration connection so that they are integrally rotated with the brake shaft 71 and the driven shaft 72. Furthermore, the gears 73, 74 are pivotally supported by bearings 61, 62, respectively, mounted on the cover 89, and by bearings 63, 75, respectively, mounted on the housing 82 such that they are rotatable. The brake shaft 71 is provided with a flanged portion 71*a* in the midst thereof and this flanged portion comes into contact with an axial end face of the bearing 75 by way of a washer 71*b* so as to restrict the movement of the brake shaft 71 in one direction. The bearing 75 which pivotally supports the brake shaft 71 is pushed into a bracket 76 which, in turn, is fixedly secured to the housing 82. A cylindrical core 77 which is made of a magnetic body is fixedly secured to one side face of the bracket 76 by welding or the like. The bracket 76 is provided with a recessed portion in the inside thereof, and a coil 78 is accommodated in the recessed portion. On the inside of the recessed portion where the coil 78 of the core 77 is accommodated, a shoulder portion is formed and, on this shoulder portion, an annular metal plate 83 made of stainless steel (SUS) and a friction plate 84 which superposes the metal plate 83 are disposed so as to close an opening where the coil 78 is disposed. In the condition that the metal plate 83 and the friction plate 84 are disposed on the shoulder portion, the friction plate 84 slightly protrudes from one end face of the core 77. Furthermore, to close the opening end of the recessed portion of the core 77 where the friction plate 84 is provided, a disc-like armature 80 made of a magnetic body is mounted on the brake shaft 71 coaxially with the core 77. This armature 80 and the brake shaft 71 are engaged with each other by means of a serration connection so that when the brake shaft 71 is rotated due to the meshing of gears 73, 74 with a moving geared cable 6, the armature 80 and the brake shaft 71 are integrally rotated. In this case, since the driven gear 74 is disposed at the opposite side of the brake gear 73 with respect to the geared cable 6, the geared cable 6 is assuredly meshed with the brake gear 73 and the driven gear 74.

Furthermore, on the outer periphery of the brake shaft 71, a coil spring 79 is mounted for biasing the armature 80 toward the friction plate 84. For holding the spring 79 in a compressed state, a ring member 86 is fitted into a groove formed in the brake shaft 71 in the vicinity of the end portion of the brake shaft 71. In such a construction, since axial movement (removal) of the brake shaft 71 in one direction is stopped by the flange portion, the armature 80 is pushed against the core by the biasing force of the spring 79 such that the armature 80 comes into contact with the friction plate 84.

In such an arrangement, the coil 78 is energized from the outside by way of a wire harness 70 and hence, electricity is supplied to the coil 78. The coil 78 is wound in a circumferential direction relative to the brake shaft 71 so as to establish a closed loop magnetic circuit among the coil 78, the core 77 and the armature 80. Due to the electromagnetic force, the armature 80 is attracted to the friction plate 84. This restricts the relative rotation which is generated between the non-rotational core 77 and the armature 80 which is integrally rotated with the brake shaft 71 when the geared cable 6 is moved. That is, the brake is applied to the brake shaft 71 by an operation of an electromagnetic clutch (brake clutch) constituted by the coil 78, the core 77 and the armature 80 so that the speed of the brake shaft 71 can be restricted.

In this case, by restricting the rotation of the brake shaft 71 which is integrally rotated with the armature 80 based on the amperage which flows in the coil 78 and the energizing time, the rotation of the brake gear 73 is restricted. As a result, the movement of the geared cable 6 which is meshed with the brake gear 73 is restricted so that the brake force is applied to the geared cable 6.

Figure 7:
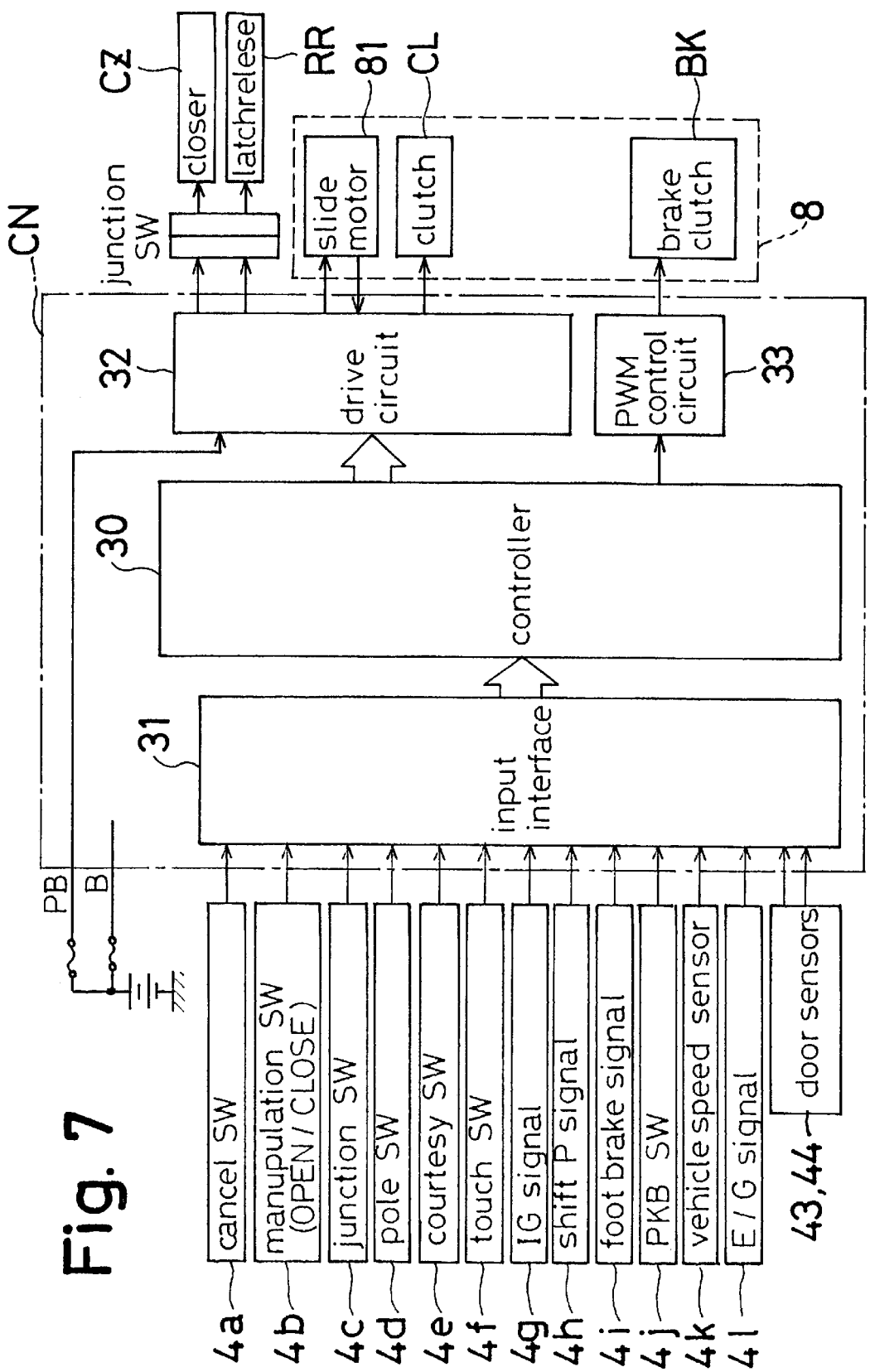
FIG. 7 is a block diagram showing the internal construction and external connections of a control equipment of one embodiment of the present invention.

Although the clutch mechanism CL and the brake mechanism BK of the drive mechanism 8 for opening or closing the slide door 1 have been explained heretofore, the manner of operation of the slide door 1 is explained in view of FIG. 1 and FIG. 7 hereinafter.

A cancel switch 4*a* is provided in the vicinity of the driver's seat. When in an "off" state, the cancel switch permits automatic operation of the door, and when in an "on" state the cancel switch prevents such automatic operation.

Also, a manipulation switch 4*b* is disposed in the vicinity of the driver's seat to control the automatic opening and closing of the door. That is, by manipulating, e.g., pushing, the manipulation switch, the slide door 1 can be fully opened or fully closed automatically by the electric motor 81. On the other hand, when the slide door 1 is slightly opened manually from the fully closed condition, or slightly closed manually from the fully opened condition, the slide door 1 is automatically fully opened or fully closed thereafter. To be more specific, in the opening operation, provided that the cancel switch 4*a* is turned off, when the manipulation switch is pushed 'OPEN' (the manipulation switch may be a two stage OFF/OFF switch), the latch of the slide door 1 is automatically released (in case the slide were latched), and so long as the pushing of the manipulation switch is continued, the slide door 1 is automatically operated until it reaches the fully opened position. On the other hand, provided that the cancel switch 4*a* is turned off, if the manipulation switch is pushed to a door-closed position, the slide door 1 is automatically operated in a closing direction and on the point of being fully closed, a closer CZ is operated so as to fully close the slide door 1.

Furthermore, provided that the cancel switch 4*a* is turned off, when the slide door 1 is manually moved from the fully closed position toward the fully opened position, the slide door 1 is automatically closed the rest of the way once the user releases the door handle. That is also true if the door is manually moved from a closed position toward an open position, i.e., the door is automatically moved the rest of the way to the fully open position when the handle is released.

In this embodiment, in case the supply of electricity to the drive transmission system of the slide door 1 is cut off by turning the cancel switch 4*a* "on", to set the slide door 1 in a free condition (i.e., a condition wherein the clutch of the drive mechanism for electrically operating the slide door 1 is turned off so that the slide door 1 can be moved freely by a manual manipulation) and the vehicle is in an inclined condition such as being placed on a descending slope or the like, the slide door 1 is liable to start its movement due to its own weight and may pinch a passenger. In this embodiment, to prevent such an accident, the brake mechanism BK prevents the slide door 1 from exceeding a given speed as will be explained.

The internal constitution and the external connection of the control unit CN will now be explained in connection with FIG. 7. Upon receiving signals from various switches and sensors by way of an input interface 31, a controller 30 executes the open/close control of the slide door 1 in response to these signals. The drive mechanism which drives the slide door 1 is driven by a drive circuit 32 in response to the output signal from the controller 30 so as to push or pull the geared cable 6 thus opening or closing the slide door 1.

The brake clutch BK which restricts the movement of the geared cable 6 is controlled by a PWM control circuit 33.

Then, to explain switches and sensors which detect the conditions of the vehicle, the cancel switch 4a is a switch which cancels the power slide control when it is turned on, the manipulation switch 4b is a switch which automatically opens the slide door 1 when pushed to a door OPEN state and automatically closes the slide door 1 when in a door CLOSE position. A pole switch 4d is a switch which is incorporated in the inside of an actuator of the door closer CZ and detects whether the slide door 1 is at a half latch condition (incompletely latched condition) or at a full latch condition (fully latched condition). A courtesy switch 4e is a switch which is turned on in response to the slide door 1 being in the opened condition, and which is turned off in response to the slide door 1 being in the closed condition. A touch switch 4f is a switch which is disposed at a position where the slide door 1 is closed and detects whether the touch switch is pushed or the disconnection occurs. A PKB (parking brake) switch 4j is a switch which detects whether a parking brake is pulled or not. A junction switch 4c is a switch which detects whether the junctions are connected or not and supplies electricity to an actuator for carrying out a latch release (releasing the latch) RR by way of the junction switch 4c when the slide door 1 is in the fully closed condition. Besides the above-mentioned switches and sensors, for detecting the conditions of the vehicle, an IG (ignition) signal 4g, a shift P signal 4h, a foot brake signal 4i, an E/G signal 4l, a signal from a vehicle speed sensor 4k which detects the vehicle speed, and signals from door sensors 43, 44 which detect the open/close condition of the slide door 1 are inputted to the input interface.

On the other hand, the door closer CZ performs the operation of the slide door 1 from the half latch condition to the fully closed condition at the time of closing the slide door 1, and the latch release RR performs the release of the latch at the time of opening the slide door 1.

The signals and the vehicle condition signals (the IG signal, the shift P signal, the foot brake signal, E/G signal) from the above-mentioned various switches (cancel switch, the door open switch, the door close switch, the pole switch, the courtesy switch, the touch switch, the IG switch, the PKB switch) and sensors (the vehicle speed sensor, the door sensors) are inputted to the control unit CN, and in response to these signals, the controller 30 judges the vehicle conditions, and operates the slide motor 81 of the slide door 1 and the clutch CL by way of the drive circuit 32. The controller 30 also outputs the signal to the PWM control circuit 33 so as to make the PWM control circuit 33 output the PWM signal thus operating the brake clutch BK.

Subsequently, the processing at the controller 30 of the control unit CN for operating the slide door 1 will be explained in conjunction with FIG. B. When electricity is supplied to the control unit CN from a battery, the control unit CN executes the main routine shown in FIG. 8. Here, only essential steps of the processing of the present invention are explained hereinafter.

Figure 8:
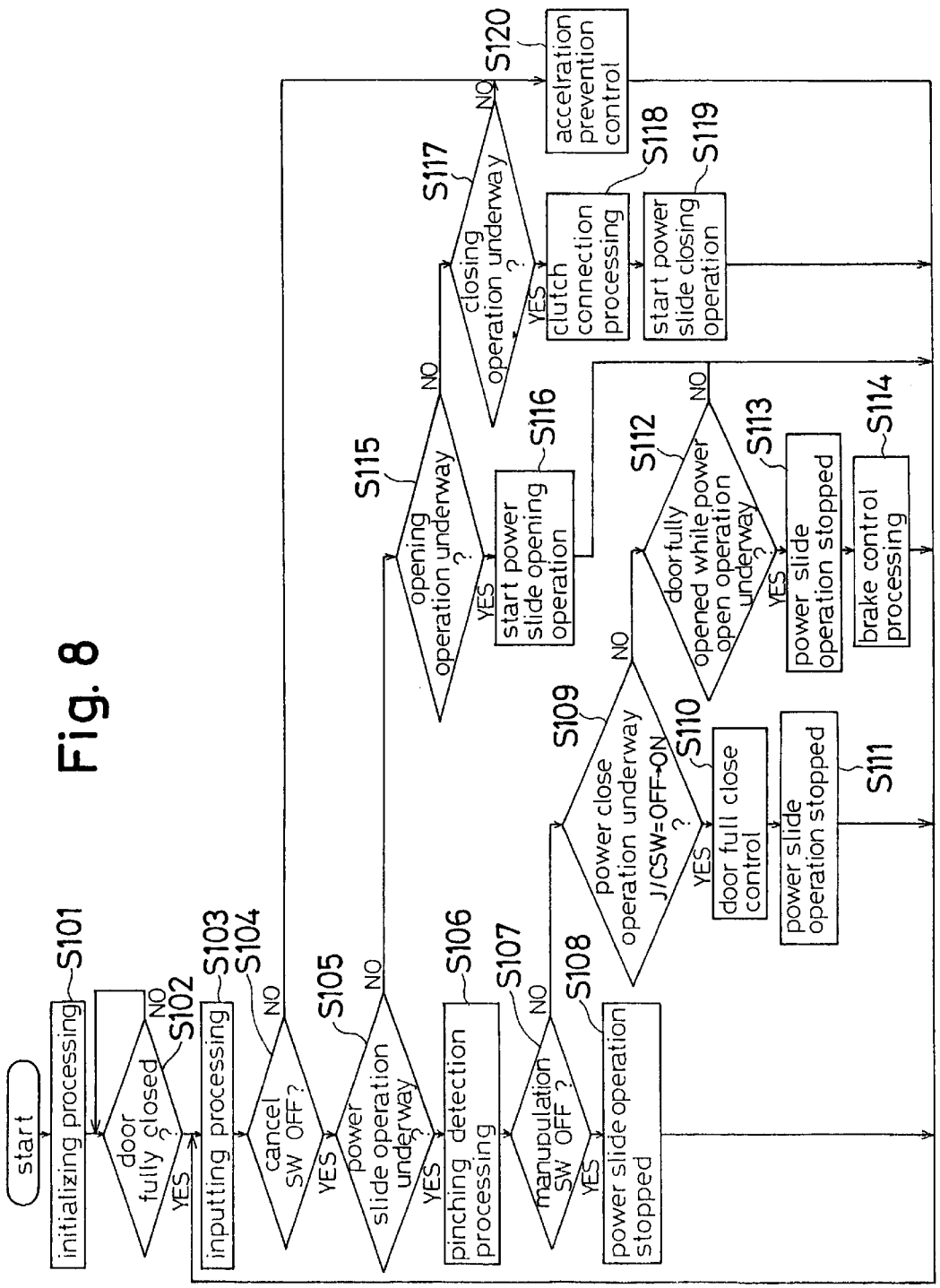
FIG. 8 is a main flow chart showing the processing carried out by a controller shown in FIG. 7.

In FIG. 8, an initializing is executed at step S101. Here, conditions of ROM and RAM are checked and whether this system is normally operated or not is checked after setting initial values to memories necessary for this processing. At step S102, whether the slide door 1 is in the fully closed condition or not is checked. The door fully closed condition is determined in view of the conditions of the pole switch 4d and the courtesy switch 4e. It is determined that the slide door 1 is in the fully closed condition when the pole switch 4d is in the latched condition (half latched condition or fully latched condition) and the courtesy switch 4e is in the OFF condition (door closed condition). At step S102, in case the slide door 1 is fully closed, an inputting processing is executed at step S103. In the inputting processing, when the signals from various switches and various sensors (see FIG. 7) which indicate the current various vehicle conditions are inputted to the input interface 31 of the control unit CN, these signals are inputted to the controller 30 and stored in necessary memories in the controller 30.

Then, at step S104, whether the cancel switch 4a which cancels the electric operation (power slide operation) of the slide door 1 is pushed or not is checked. Here, in case the cancel switch 4a is pushed (ON condition), an acceleration prevention control which controls the movement of the slide door 1 is executed at step S120 and the processing returns to step S103. However, in case the cancel switch 4a is not pushed (OFF condition), whether the power slide operation is under way or not is checked at step S105. The determination whether the power slide operation is under way or not is executed by watching the condition of the power slide opening and closing operation flag. In case the power slide operation is not under way, the processing is advanced to step S115. In case the power slide operation is under way, the processing is advanced to step S106 where a pinching detection processing is executed. In this pinching detection processing, the pinching of the passenger or the like to the body side (pillar) which may occur due to the movement of the slide door 1 is detected.

After executing the pinching detection processing, whether the open or close manipulation switch 4b is pushed or not is checked at step S107. Here, in case the manipulation switch 4b is not pushed, at step 5108, the power slide opening and closing operations flag is cleared while holding the clutch CL in the ON condition, and the motor 81 is turned off so as to stop the power slide operation and the processing returns to step S103.

In case the power slide operation is not under way at step S105, the processing returns to step S115. Here, whether the manipulation switch 4b is pushed to the door-open side or not is checked, and at the moment when it is detected that the manipulation switch 4b is switched to the door-open side, the flag relating to the power slide open operation is set so as to start the power slide open operation and the processing returns to the step S103.

On the other hand, in case the condition of step S115 is not established (other than the moment that the manipulation switch 4b is pushed to the door-open side), whether the manipulation switch 4b is pushed to the door-close position or not is checked. Here, the moment that it is detected that the manipulation switch 4b is pushed to the door-closed side the clutch connecting processing is executed at step S118. In case the slide door 1 is electrically driven and the manipulation switch 4b is manipulated, when the slide door 1 is moved to a position of a given distance by the manual manipulation, this clutch connecting processing energizes the coil 80 of the drive mechanism 8 so as to make the coil 80 generate the electromagnetic force which connects the clutch CL to make the rotor 98 and the ring member 95 rotate integrally, thus carrying out the power slide operation by the electric power. In this case, whether the door speed for moving the slide door 1 exceeds a given speed or not is checked and in case the door speed exceeds the given speed, a brake is applied by means of the brake mechanism BK so as to slow down the moving speed of the slide door 1. After completing the clutch connecting processing, the power slide close opening flag is set at step S119 and the processing returns to step S103.

In case the manipulating switch 4b is pushed to the door open side or the door close side at step S107, the processing at step S109 and ensuing steps are executed. At step S109, whether the junction switch 4c is changed over from the OFF condition to the ON condition during the power closing operation, that is, whether a female terminal mounted on a portion to which the slide door 1 of the body side is connected and a male terminal which comes into contact with the female terminal mounted at the slide door side are connected with each other or not during the slide door closing operation (to be more specific, before the closer CZ is operated, the slide door 1 is in the condition that it is substantially closed at a position some tens mm in front of the fully closed position) is checked. In case the junction switch 4c is changed over from the off condition to the ON condition, at step S110, the operation is moved from the slide operation to the closer operation and the door closing control for closing the slide door 1 from the incompletely closed condition to the completely closed condition is executed. In step S111, the motor 81 is turned off, the clutch CL is turned off and the power slide close operation flag is cleared and after stopping the power slide operation, the processing returns to the step S103.

On the other hand, at step S109, in case the junction switch 4c is not changed over from the OFF condition to the ON condition (not in a completely closed condition), at step S112, whether the slide door 1 is fully opened during the power opening operation this time or not is checked. Here, in case the condition of the step S112 is not established (in case the door is not fully opened during the power slide opening operation), the processing returns to the step S103. In case the slide door 1 is fully opened by the power slide movement, at step S113, the motor 81 is turned off, the clutch CL is turned off and the power slide open operation flag is turned off so as to stop the power slide operation. Thereafter, since the slide door 1 is in the fully opened position here, at step S114, a brake control for intermittently applying the brake to enable the door to return to a position where it is held open (the holding position where the rollers 5a of the roller units 5 for supporting the slide door 1 are stopped by the action of the check spring mounted on the vehicle-side lower guide rails) is executed in case the vehicle is in an inclined condition as well as the door being in an open condition. Hence, the roller 5a is assuredly stopped by the stopping portion so that the door is in a free condition. Accordingly, as shown in FIG. 13(a), even when the vehicle is in an inclined condition and the clutch CL is turned off to make the slide door 1 in a free condition, the position of the roller 5a can be shifted to a stopper portion so as to prevent the slide door 1 in the open condition from overriding the stopper portion of the check spring so that the roller 5a is assuredly stopped at the stopper portion of the check spring and the slide door 1 can be held open even on a slope or the like.

Subsequently, the interruption processing shown in FIG. 9 is explained hereinafter. Signals from door sensors 43, 44 are inputted to the control unit CN. In case the leading edge and the trailing edge of this signal are inputted, the interruption processing is automatically executed against the main routine. In this processing, at step S201, based on the edge direction of the door sensor 43 (DS1) and the electric potential level of another sensor 44 (DS2), the moving direction of the door is determined (see the interpretation of the flow). Thereafter, whether the slide door 1 is moved in an opening direction from the fully closed condition or not (whether the signal is changed from the ON condition to the OFF condition) is checked. In case the slide door 1 is opened from the fully closed condition, the door position is reset as the door fully closed position and a time between an edge of DS1 and an edge of one preceding DS1 is obtained and the inverse number thereof is calculated to obtain the door speed.

In this processing, at the very moment the slide door 1 is opened, the value of a door position counter which stores where the slide door 1 is currently positioned is reset and initializing is executed at the fully closed condition. However, in case the slide door 1 is not opened from the fully closed condition, the reset is not executed and at step S203, the door position counter is incremented in an opening direction and decremented in a closing direction depending on the door moving direction, and the door condition is stored sequentially, and thereafter, at step S205, since the distance between the edges is constant, the door speed can be calculated by taking the inverse number of the edge interval time.

To be more specific, when the edge of DS1 is detected, the condition of DS2 at the point of time is read. In case DS2 is high (high electric potential H) at the trailing edge of DS1 or DS2 is low (low electric potential L) at the leading edge of DS1, it is detected that the slide door 1 is moved by one pulse in a door opening direction, while in case DS2 is low at the trailing edge of DS1 or DS2 is high at the leading edge of DS1, it is detected that the slide door 1 is moved by one pulse in a door closing direction, and the door fully closed position is initialized as the origin. Each time the edge enters DS1, the count number of the door position is increased or decreased so as to recognize the door position.

Due to such an arrangement, each time the edges are inputted from the door sensors 43, 44, this processing is executed, and information on the door position, the door velocity and the moving direction of the slide door 1 are obtained as door information by the interruption processing.

Figure 10B:
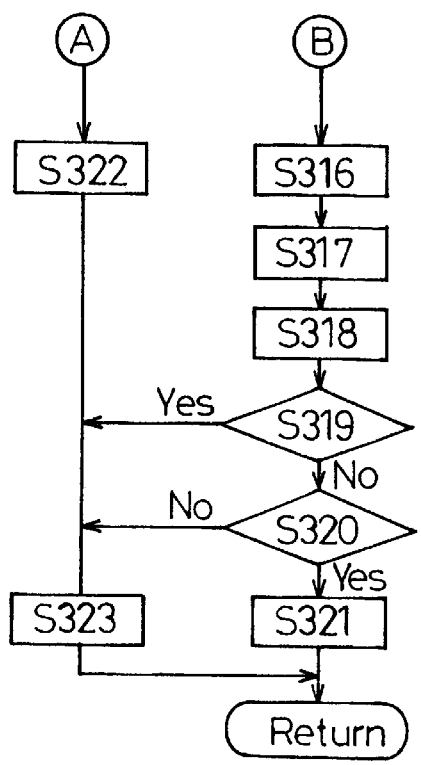

Subsequently, the acceleration prevention control of the slide door 1 of the present invention is explained in conjunction with FIGS. 10A and 10B. This processing is executed at a given interval (for example, 4 ms). At step S301, the condition of the door speed is sequentially renewed and stored such that information on the door speed at this time is inputted to the memory which already stores the door speed of last time (4 ms before) and is renewed. At next step S302, the door information (the moving direction, the moving position, the moving speed of the slide door 1) obtained by the interruption processing are read out, and at step S303, whether the door speed is zero or not, that is, whether the slide door 1 is in the stopped condition or not is checked. At step S322, in case the slide door 1 is not operated (stopped condition), it is unnecessary to apply a brake by means of the brake mechanism BK and hence, the duty ON time is set to zero. The brake operation by means of the brake mechanism BK is executed based on the duty control by way of the PWM control circuit 33, wherein the duty control is executed in response to the duty ratio between the duty ON time (indicating brake operating time and being 80 at maximum here) and the duty OFF time.

Figure 12:
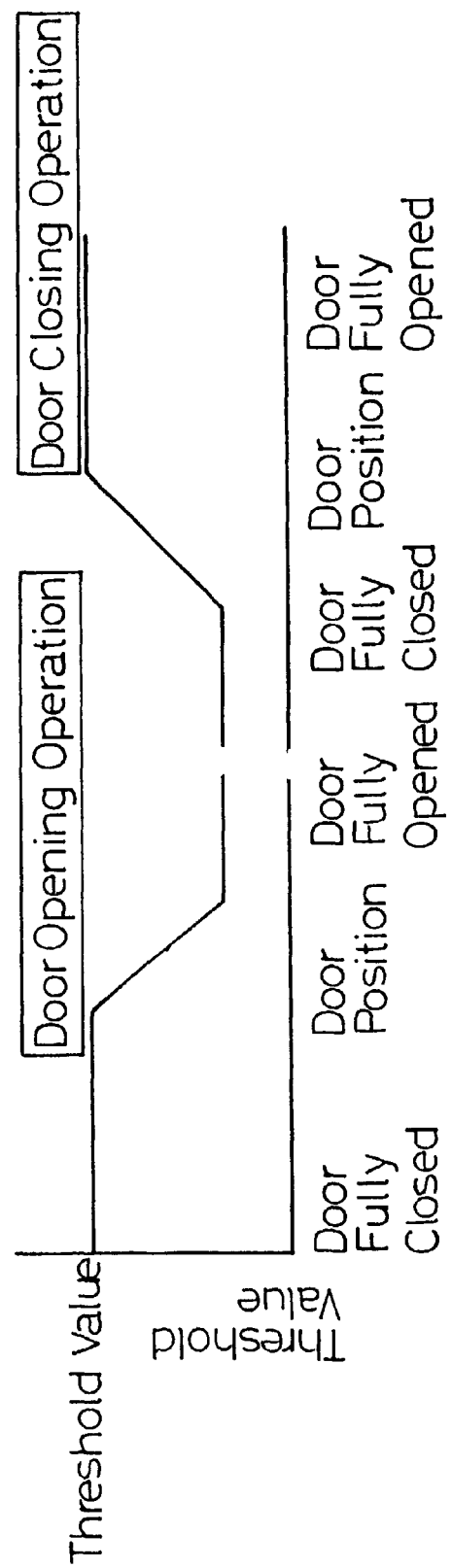
FIG. 12 is a graph showing the relationship between the door position and the speed threshold value in opening and closing operations of the slide door.

On the other hand, at step S303, in case the door speed is not zero (in case the slide door 1 is being operated), step S304 and other ensuing steps are executed. At step S304, the door speed threshold value is used as the reference. As shown in FIG. 12, this threshold value reference means that the door speed threshold value is set with respect to the door position from the fully closed position to the fully opened position of the slide door 1, wherein, in the door opening operation, the speed threshold value is set larger as the slide door 1 is located closer to the fully closed position and smaller as the slide door 1 is located closer to the fully open position so that when the slide door 1 is opened from the fully closed condition, the door speed of the slide door 1 is set high at the initial stage of the manipulation and the door speed is sufficiently attenuated on the point of fully opening the slide door 1. Furthermore, in the door closing operation, the speed threshold value is set smaller as the slide door 1 is located closer to the fully closed position and larger as the slide door 1 is located closer to the fully open position so that when the slide door 1 is closed from the fully opened condition, the door speed of the slide door 1 is set high at the initial stage of the manipulation and the door speed is sufficiently attenuated on the point of fully closing the slide door 1.

At next step S305, the door speed is compared with the speed threshold value obtained at step S304 and the duty ON time is divided in several cases. At step S305, in case the door speed is lower than the speed threshold value, the processing is moved to step S315 where the duty ON time is largely decreased (condition 1). In case the door speed becomes equal to or exceeds the speed threshold value, at step S306, the deceleration quantity is calculated based on the deviation between the door speed of the slide door 1 of the last time (4 ms before) and the current door speed of the slide door 1. Thereafter, at step S307, whether the deceleration of the slide door 1 is executed based on the calculated deceleration quantity or not is checked. In case the slide door 1 is not decelerated, the processing is moved to step S314 where the duty ON time is largely increased (condition 5). On the other hand, in case the movement of the slide door 1 is decelerated, the processing at step S308 and ensuing steps are executed. At step S308, the deviation between the door speed and the speed threshold value obtained at step S304 is set as the speed difference. At step S309, the duty ON time is further divided into cases based on the relationship between the deceleration quantity and the speed difference. In case the deceleration quantity is equal to or larger than the speed difference, the processing is moved to step S313 where the duty ON time is decreased to a small value (condition 2). On the other hand, in case the deceleration quantity is smaller than the speed difference, at step S310, the double of the deceleration quantity is compared with the speed difference. Here, in case the double of the deceleration quantity is equal to or larger than the speed difference, the processing is moved to step S312 where the duty ON time is held (condition 3). On the other hand, in case the double of the deceleration quantity is smaller than the speed difference, the duty ON time is slightly increased at step S311 (condition 4).

That is, from step S305 to step, S315, as shown in FIG. 11, the door speed of last time and the current door speed are compared with each other and the duty ON time is set based on how much the door speed of the slide door 1 is to be lowered by operating the brake so as to make the door speed approach the speed threshold value after a lapse of a given time 't' (here, 4 ms) and the duty ON time is divided into condition 1 to condition 5. This shows the condition before the voltage compensation.

Then, at step S316, the restriction is applied to the increased or decreased duty ON time with the maximum value (opening direction: 3420, closing direction: 2700) so as to prevent the sudden application of the brake to the movement of the slide door 1. At step S317, the duty ON time is compensated by the reference voltage and this compensated value is set as the ON count number (this becomes the time for operating the brake). To be more specific, in case the duty increment value before compensation is large in an opening/closing direction, the ON count number is set to 360-90 while in case such a duty increment value before compensation is small, the ON count number is set to 225-45. Furthermore, corresponding to the maximum value of the duty before compensation, the upper limit restriction is applied to the ON count number and is set preliminarily to a value which prevents the sudden application of the brake to the slide door 1. The duty ON time is determined based on the duty increment value before compensation, and the source voltage value applied to the control unit CN, and is calculated by a calculating formula of the duty increment value before compensation/(source voltage value coefficient K). Thereafter, at step S318, the restriction is made on the upper limit (the number of count: 80) of the ON time (the number of ON count). Based on the duty ON time obtained in the above-mentioned manner, the controller 30 outputs the signal to the PWM control circuit 33. In this condition, although the duty output which coincides with the duty ON time is supplied to the PWM control circuit 33, here, the brake clutch BK is not allowed to perform the brake operation.

In succeeding step S319, the door speed is compared with an output OFF threshold value (the door speed of 0.144 m/s corresponding to the door rotation of 3000 rpm) which stops the duty control. Here, in case the door speed is smaller than the threshold value, it is unnecessary to apply the brake against the movement of the slide door 1 and hence, at step S323, the duty output is turned off (prohibited). Otherwise, at step S320, the door speed is compared with an output ON threshold value (the door speed of 0.241 m/s corresponding to the door rotation of 5000 rpm) for executing the duty control. In case the door speed is smaller than the output ON threshold value, it is unnecessary to apply the brake operation to the movement of the slide door 1 and hence, at step S323, the duty output is turned off (prohibited). On the other hand, in case the door speed is equal to or more than the output ON threshold value at step S320, the duty output is turned on (allowed) at step S321, that is, the duty control is applied to the coil 78 of the brake clutch BK based on the duty ON time set at steps S311–S315 so that brake operation of the brake mechanism is carried out.

That is, in this acceleration prevention control, the door speed threshold value is set depending on the position of the slide door 1, and the brake mechanism BK is operated so as to make the door speed approach the speed threshold value and hence, the brake torque is controlled. As shown in FIG. 12, at the time of fully opening the slide door 1 (fully opened condition) or at the time of fully closing the slide door 1 (fully closed condition), the speed threshold value is set low so as to make the door speed relatively slow, while at the time of starting the closing or opening of the slide door 1, the speed threshold value is set high so as to prevent the brake force from being excessively applied to the slide door 1, thus enhancing the operability.

Furthermore, in approaching the door speed to the speed threshold value, the signal (voltage value) applied to the brake clutch is changed by the PWM control, and the time of one period of electric voltage pulse is fixed and the period is divided into eighty, and the real voltage is controlled based on the number counted therein.

In this case, the duty ON time is set such that, as shown in FIG. 11, the current door speed and the door speed threshold value taken in one preceding step are compared with other, and in case the current door speed is equal to or lower than the threshold value, the duty ON time is largely decreased (condition 1), and in case the deceleration of the slide door 1 is as large as or larger than the threshold value after the next period (4 ms), the duty ON time is slightly decreased (condition 2, and in case the deceleration of the slide door is as large as or larger than the threshold value after next period (8 ms), the duty ON time is held (condition 3). Furthermore, in case the current door speed is equal to or smaller than the preceding door speed, the duty ON time is slightly increased (condition 4), and in case the current door speed is larger than the preceding door speed, the duty ON time is largely increased (condition 5). Here, in case the increase and decrease value of the ON time in five patterns is excessively large, a direct and strong brake force is applied and hence, the operability is deteriorated, while in case the increase and decrease value of the ON time is excessively small, the braking force is not increased promptly when it is necessary so that the door speed is excessively increased. Accordingly, the set value of this duty ON time is to be determined to meet these both conditions.

Furthermore, depending on the voltage value before executing the PWM control, the final torque becomes different even in the same duty ON time. Accordingly, in the present invention, the set ON time is divided by the source voltage values thus compensating the influence of the voltage value so that the accurate control based on the source voltage supplied to the controller 30 becomes possible. In such a control, by restricting the door speed with the control by means of the action of the brake mechanism BK, the door speed can be made slow in the fully closed condition or in the fully opened condition so that safety is assured, and the manipulating sound is suppressed compared with the conventional equipment, and the danger of pinching at the time of door manipulation can be eliminated because of the slow door speed thus enhancing safety, and the manipulation of the door due to the brake is not constrained over the necessity thus enhancing the operability.

According to the present invention, in the open/close body control unit which operates the open/close body relative to the fixed member and carries out the open/close operation with the open/close body, the equipment includes the brake mechanism which restricts the moving speed in the midst of the operation of the open/close body and open/close body moving condition detecting means which detects at least one of the moving direction, the moving position and the moving speed while the open/close body is being moved, and the brake mechanism, is operated in response to information from the open/close body moving condition detecting means. Due to such a constitution, at least one of the moving direction of the open/close body, the moving position and the speed of the open/close body is detected by the open/close body moving condition detecting means, and the brake mechanism is operated in response to information from the open/close body moving condition detecting means. Hence, a brake can be operated by means of the brake mechanism in response to the moving direction, the moving position, or the moving speed of the open/close body, and the operation of the open/close body can be restricted by the brake mechanism in response to the moving condition of the open/close body. For example, even in case the open/close body is forcefully manipulated manually, the speed of the open/close body is decreased due to the restriction of the brake mechanism and hence, security is assured. Furthermore, the speed of the open/close body is suppressed when the open/close body assumes the fully open condition or the fully closed condition so that the manipulation sound at that moment can be suppressed more effectively than the conventional equipment, and the deterioration of the feeling which occurs with the conventional equipment no more occurs.

Here, in case the open/close body speed threshold value which corresponds to the moving position of the open/close body is set and the brake mechanism is controlled based on the comparison between the information of the open/close body speed and the open/close body speed threshold value, by setting the proper speed threshold value corresponding to the moving position of the open/close body, the open/close body can be operated at the proper speed by operating the brake mechanism such that the open/close body takes a given speed at that position during operation of the open/close body.

Furthermore, by making the speed threshold value of the open/close body take the small value at the point of reaching the fully opened condition in case of moving the open/close body in an opening direction, and on the point of reaching the fully closed position in case of moving the open/close body in a closing direction, the speed can be sufficiently restricted at the fully opened position or the fully closed position so that the safety is assured and the manipulation sound can be attenuated.

Still furthermore, in case of starting the operation of the open/close body, by making the speed threshold value of the open/close body assume a large value at the time of starting opening or closing of the open/close body, it becomes possible to prevent the operability of the open/close body at the initial stage of the operation after starting from being worsened.

In addition, in case the brake mechanism is operated under a duty control, a more precise control becomes possible due to such a duty control.

What is claimed is:

1. An apparatus comprising:

a member having an opening;

an open/close body movably mounted on the member for opening and closing the opening;

a driving mechanism which generates a driving force to move the open/close body;

a clutch mechanism which controls transmission of the driving force from the driving mechanism to the open/close body;

a detecting mechanism which detects at least a position of the open/close body and a moving speed of the open/close body;

a controller which determines a pre-set speed threshold value based on the position of the open/close body detected by the detecting mechanism;

a brake mechanism operably connected to the detecting mechanism and the controller which restricts the movement of the open/close body based on a comparison between the speed of the open/close body detected by the detecting mechanism and the pre-set speed threshold value determined by the controller, the brake mechanism being operated to restrict movement of the open/close body when the driving force is not transmitted from the driving mechanism to the open/close body by the clutch mechanism.

2. The apparatus according to claim 1 wherein the pre-set threshold speed for an opening of the open/close body is lowest at a position of the open/close body adjacent a fully open state, and the pre-set threshold speed for a closing of the open/close body is lowest at a position of the body adjacent a fully closed state.

3. The apparatus according to claim 1 wherein the pre-set threshold speed for an opening of the open/close body is highest when the open/close body begins an opening movement, and the pre-set threshold speed for a closing of the open/close body is highest when the open/close body begins a closing movement.

4. The apparatus according to claim 1 wherein the member is a vehicle, and the open/close body is a slidable door.

5. A method of controlling a speed of an open/close body which opens and closes an opening in a member, comprising:

detecting at least a position of the open/close body and a moving speed of the open/close body;

determining a threshold speed based on the detected position of the open/close body;

comparing the detected moving speed of the open/close body with the threshold speed; and restricting the speed of the open/close body when the detected moving speed of the open/close body is larger than the threshold speed.

6. The method according to claim 5 wherein the threshold speed of the open/close body is greater at the beginning of an opening operation than at the end of the opening operation.

7. The method according to claim 5 wherein the threshold speed of the open/close body is greater at the beginning of a door closing operation than at the end of the closing operation.

8. The method according to claim 5 wherein the member is a vehicle, and the open/close body is a sliding door.

9. The method according to claim 5 wherein the open/close body is moved by a driving force generated by a driving mechanism, and including operating a brake mechanism to restrict the speed of the open/close body when the detected moving speed of the open/close body is larger than the threshold speed under a condition in which the driving force is not transmitted from the driving mechanism to the open/close body.

10. An apparatus comprising:

a member having an opening;

an open/close body movably mounted on the member for opening and closing the opening;

a driving mechanism which generates a driving force to move the open/close body;

a clutch mechanism which controls transmission of the driving force from the driving mechanism to the open/close body;

a detecting mechanism which detects a position of the open/close body, a moving speed of the open/close body and a moving direction of the open/close body;

a controller which determines a pre-set speed threshold value based on the position and the moving direction of the open/close body detected by the detecting mechanism; and a brake mechanism operably connected to the detecting mechanism and the controller which restricts the movement of the open/close body when the speed of the open/close body detected by the detecting mechanism is larger than the pre-set speed threshold value determined by the controller.

11. The apparatus according to claim 10 wherein the pre-set threshold speed during opening of the open/close body is lowest at a position of the open/close body adjacent a fully opened state.

12. The apparatus according to claim 10 wherein the pre-set threshold speed during closing of the open/close body is lowest at a position of the open/close body adjacent a fully closed state.

13. The apparatus according to claim 10 wherein the member having the opening is a vehicle and the open/close body comprises a sliding door of the vehicle.

* * * * *